United States Patent
Stanton et al.

(10) Patent No.: US 10,147,220 B2
(45) Date of Patent: Dec. 4, 2018

(54) PRECOMPUTING DATA FOR AN INTERACTIVE SYSTEM HAVING DISCRETE CONTROL INPUTS

(71) Applicants: Carnegie Mellon University, Pittsburgh, PA (US); Regents of the University of California, Oakland, CA (US)

(72) Inventors: Matthew Stanton, Pittsburgh, PA (US); Adrien Treuille, Pittsburgh, PA (US); Kayvon Fatahalian, Pittsburgh, PA (US); James O'Brien, Pittsburgh, PA (US); Ben Humberston, Pittsburgh, PA (US); Brandon Kase, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 2 days.

(21) Appl. No.: 15/126,149

(22) PCT Filed: Mar. 13, 2015

(86) PCT No.: PCT/US2015/020445
§ 371 (c)(1),
(2) Date: Sep. 14, 2016

(87) PCT Pub. No.: WO2015/138896
PCT Pub. Date: Sep. 17, 2015

(65) Prior Publication Data
US 2017/0076488 A1 Mar. 16, 2017

Related U.S. Application Data

(60) Provisional application No. 61/967,301, filed on Mar. 14, 2014.

(51) Int. Cl.
*G06T 13/60* (2011.01)
*G06T 11/20* (2006.01)
*G06T 15/50* (2011.01)

(52) U.S. Cl.
CPC ............ *G06T 13/60* (2013.01); *G06T 11/206* (2013.01); *G06T 15/503* (2013.01); *G06T 2207/20092* (2013.01)

(58) Field of Classification Search
CPC ......... G06T 13/40; G06T 13/00; G06T 13/80; G06T 13/20; A63F 13/10
See application file for complete search history.

(56) References Cited

U.S. PATENT DOCUMENTS 5,465,321 A * 11/1995 Smyth ................. G06F 11/2257
376/216
6,462,742 B1 10/2002 Rose et al.
(Continued)

FOREIGN PATENT DOCUMENTS

| CN | 101779180 | 7/2010 |
| WO | WO2014164746 | 10/2014 |
| WO | WO15138896 | 9/2015 |

OTHER PUBLICATIONS

International Search Report and Written Opinion dated Jun. 25, 2015 for corresponding Int'l. Appln. No. PCT/US15/20445 (13 pgs.).

(Continued)

*Primary Examiner* — Todd Buttram
(74) *Attorney, Agent, or Firm* — Fish & Richardson P.C.

(57) ABSTRACT

A computer-implemented method includes accessing a plurality of sets of outputs for an interactive animation, with each set of outputs being associated with a different sequence of a plurality of sequences of discrete control inputs, and with each set of outputs comprising an output that provides a stored portion of the animation; and trans- (Continued)

mitting, to a client device, information indicative of at least one of the plurality of sets of outputs for the animation and the output that provides the stored portion of the animation, which when rendered by the client device causes the animation to be presented to a user.

53 Claims, 5 Drawing Sheets

(56) References Cited

U.S. PATENT DOCUMENTS

| | | | |
|---|---|---|---|
| 6,522,331 B1* | 2/2003 | Danks | G06T 13/40 345/473 |
| 8,755,837 B2 | 6/2014 | Rhoads et al. | |
| 8,775,518 B2 | 7/2014 | Limpaecher et al. | |
| 2005/0001842 A1 | 1/2005 | Park et al. | |
| 2006/0181536 A1 | 8/2006 | Ostermann et al. | |
| 2007/0260984 A1* | 11/2007 | Marks | A63F 13/06 715/706 |
| 2010/0125563 A1 | 5/2010 | Nair et al. | |

OTHER PUBLICATIONS

Page and Brin (1998), "The PageRank citation ranking: bringing order to the Web," Technical Report, pp. 1-17.

McCann, J. and Pollard, N., "Responsive Characters from motion fragments," ACM Trans. Graph. 26, Jul. 3, 2007, pp. 1-8.

Theodore Kim and John Delaney, "Subspace fluid re-simulation," ACM Trans. Graph. 32, Jul. 4, 62:1-62:9, pp. 1-11 (2013).

James D.L., and Fatahalian, K., "Precomputating interactive dynamic deformable scenes," Tech. Rep. CMU-RI-TR-03-33, Carnegie Mellon University Robotics Institute, pp. 1-24 (2003).

Yuchen Zhang et al., "Spectral Methods Meet EM: A Provably Optimal Algorithm for Crowdsourcing," Journal of Machine Learning Research, 17:1-44 (2016).

* cited by examiner

PRECOMPUTING DATA FOR AN INTERACTIVE SYSTEM HAVING DISCRETE CONTROL INPUTS

CROSS REFERENCE TO RELATED APPLICATIONS

This application is a § 371 National Stage Application of PCT/US2015/020445, filed Mar. 13, 2015, which, in turn, claims the benefit of priority under 35 U.S.C. § 119(e) to provisional U.S. Patent Application No. 61/967,301, filed Mar. 14, 2014, the entire contents of each of which are hereby incorporated by reference.

STATEMENT REGARDING FEDERALLY SPONSORED RESEARCH AND DEVELOPMENT

This invention was made with government support under IIS0953985 awarded by the National Science Foundation. The government has certain rights to this invention.

FIELD OF USE

The present disclosure relates to precomputing data that is to be presented in real time.

BACKGROUND

A processing system can be used to perform massive precomputations based on many gigabytes of data and hundreds of hours of computing time. Even with the vast computational resources provided by a processing system, dynamical spaces may be so large that precomputing the entire state space may be difficult.

SUMMARY

The present disclosure describes methods and systems relating to precomputing a plurality of outputs that are to be presented in real time. In one aspect of the present disclosure, a computer-implemented method includes accessing a plurality of sets of outputs for an interactive animation, with each set of outputs being associated with a different sequence of a plurality of sequences of discrete control inputs, and with each set of outputs comprising an output that provides a stored portion of the animation; and transmitting, to a client device, information indicative of at least one of the plurality of sets of outputs for the animation and the output that provides the stored portion of the animation, which when rendered by the client device causes the animation to be presented to a user.

Implementations of the disclosure can include one or more of the following features. The method can include generating the plurality of sets of outputs for the animation prior to transmitting the information to the client device. Generating the plurality of sets of outputs for the animation can include generating a directed graph comprising a plurality of vertices and a plurality of edges, with each of the plurality of vertices representing a state of the animation that is responsive to a discrete control input, with each of the plurality of vertices connected to a number of outgoing edges where the number is equivalent to a number of possible discrete control inputs, and with each edge connecting two of the plurality of vertices and representing an output of the plurality of sets of outputs. Generating the plurality of sets of outputs for the animation can include generating the plurality of sets of outputs for the animation based on a heuristic user model. Generating the plurality of sets of outputs for the animation can include generating the plurality of sets of outputs for the animation based on receiving, from a plurality of client devices, sequences of discrete control inputs that are associated with sets of outputs of the plurality of sets of outputs for the animation. Generating the plurality of sets of outputs for the animation can include generating the plurality of sets of outputs for the animation using a kernel density estimator combined with a Markov prior. Generating the plurality of sets of outputs for the animation can include identifying an undesirable output of the plurality of sets of outputs that provides an undesirable blend of stored portions of the animation; and modifying the undesirable output so that the undesirable output provides a stored portion of the animation. A stored portion of the animation can include at least one of a static image, a sequence of static images, one or more signed distance functions, or a sequence of polygon meshes. The output that provides the stored portion of the animation is a first output that provides a first stored portion of the animation, and the method can include receiving a sequence of discrete control inputs for the at least one of the plurality of sets transmitted; generating, by one or more processing devices, a second output for the at least one of the sets of outputs in accordance with the received sequence of discrete control inputs so that the second output provides a second stored portion of the animation, the second output to be provided after the first output of the set of outputs during presentation of the animation; and updating the plurality of sets of outputs for the animation with the second output for the set of outputs associated with the received sequence of discrete control inputs. Each set of outputs of the accessed plurality of sets of outputs can include a third output that provides a blend of stored portions of the animation, the third output to be provided after the first output of the set of outputs during presentation of the animation. Updating the plurality of sets of outputs for the animation with the second output can include replacing the third output of the set of outputs associated with the received sequence of discrete control inputs with the second output. The method can include generating a fourth output that provides a blend of stored portions of the animation, the fourth output to be provided after the second output during presentation of the animation. The method can include, while the animation is being presented to the user, generating data in real-time for presentation to the user along with the animation. Transmitting, to the client device, the information indicative of the at least one of the plurality of sets of outputs for the animation can include generating a renderable representation of the animation provided by the at least one of the plurality of sets of outputs; and transmitting the renderable representation of the animation for rendering by the client device in real-time. Transmitting, to the client device, the information indicative of the at least one of the plurality of sets of outputs for the animation can include transmitting visualization data for the animation, which when processed by the client device causes the client device to generate a renderable representation of the animation and to render the renderable representation for presentation of the animation to the user. Transmitting the information indicative of the at least one of the plurality of sets of outputs for the animation can include transmitting information for an online game that comprises the at least one of the plurality of sets of outputs for the animation. Transmitting the information indicative of the at least one of the plurality of sets of outputs for the animation can include transmitting the information indicative of the at least one of the plurality of sets of outputs for the animation based on a prediction of a sequence of discrete control inputs to be received during presentation of the animation to a user.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description, the drawings, and the claims.

DETAILED DESCRIPTION

The techniques described in the present disclosure can be used in applications such as virtual reality, mapping, movies, visual communication, interactive simulation and training, architecture, three-dimensional design, and the creation of interactive content. Although the techniques described in the present disclosure are applicable to a wide range of applications, various implementations will be described below in the context of a video game. While specific implementations are described, other implementations exist that include operations and components different than those illustrated and described below.

Figure 1:
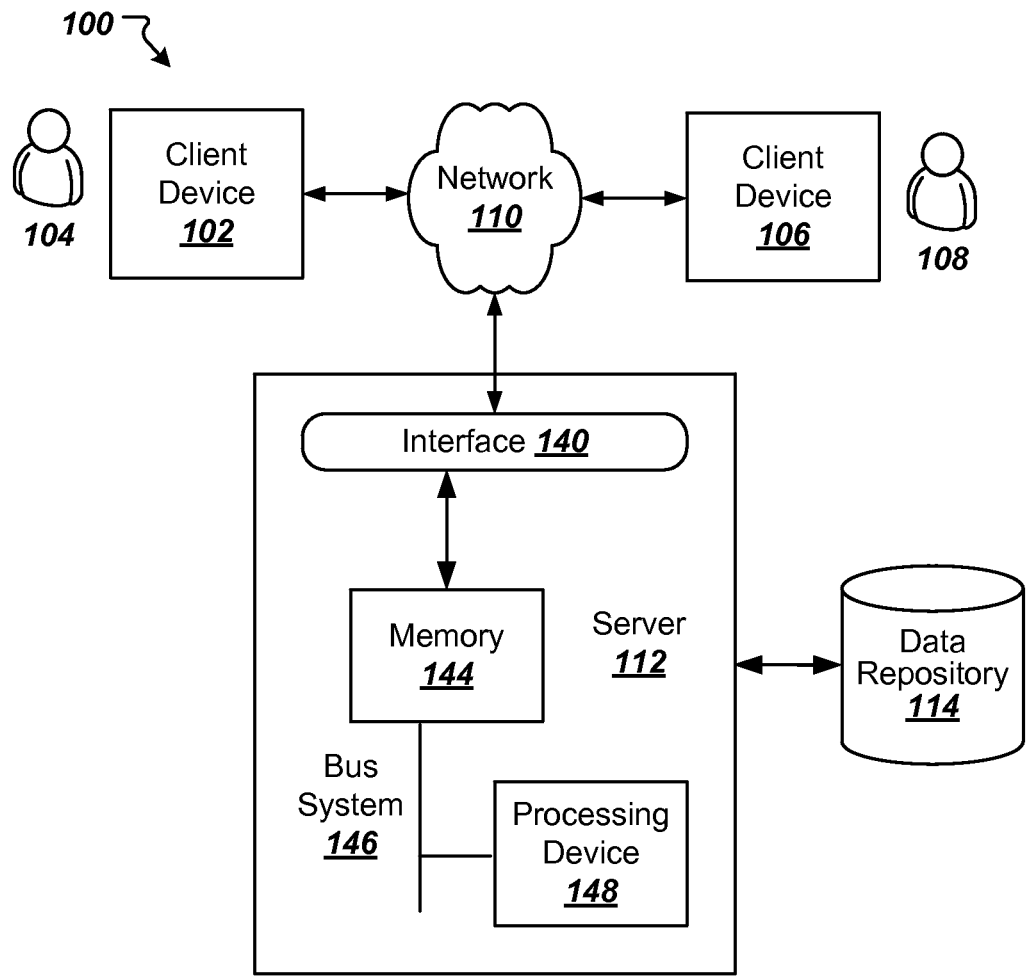
FIG. 1 is a block diagram of an example of a network environment for precomputing data that are to be presented in real time.

FIG. 1 is a block diagram of an example of a network environment 100 for precomputing data that are to be presented in real time. Network environment 100 includes client devices 102, network 110, server 112, and data repository 114. The client devices 102 and 106 can be used by users 104 and 108. The client devices 102 and 106 can be mobile devices, desktop computers, laptops, cell phones, personal digital assistants ("PDAs"), servers, embedded computing systems, and so forth.

The server 112 is a system for precomputing data that are to be presented to users 104 in real time and collecting inputs that are entered by the users 104 during presentation of the precomputed data. Server 112 can be any of a variety of computing devices capable of receiving data, such as a server, a distributed computing system, a desktop computer, a laptop, a cell phone, a rack-mounted server, and so forth. Server 112 may be a single server or a group of servers that are at the same location or at different locations.

The illustrated server 112 can receive data from the client devices 102 via input/output ("I/O") interface 140. I/O interface 140 can be any type of interface capable of receiving data over a network, such as an Ethernet interface, a wireless networking interface, a fiber-optic networking interface, a modem, and so forth. A bus system 146, including, for example, a data bus and a motherboard, can be used to establish and to control data communication between the components of server 112.

Server 112 also includes a processing device 148 and memory 144. The illustrated processing device 148 includes one or more microprocessors. Generally, processing device 148 may include any appropriate processor and/or logic that is capable of receiving and storing data, and of communicating over bus system 146. Memory 144 can include a hard drive and a random access memory storage device, such as a dynamic random access memory, or other types of non-transitory machine-readable storage devices. Memory 144 stores computer programs (not shown) that are executable by processing device 148 to perform the techniques described herein.

Figure 2:
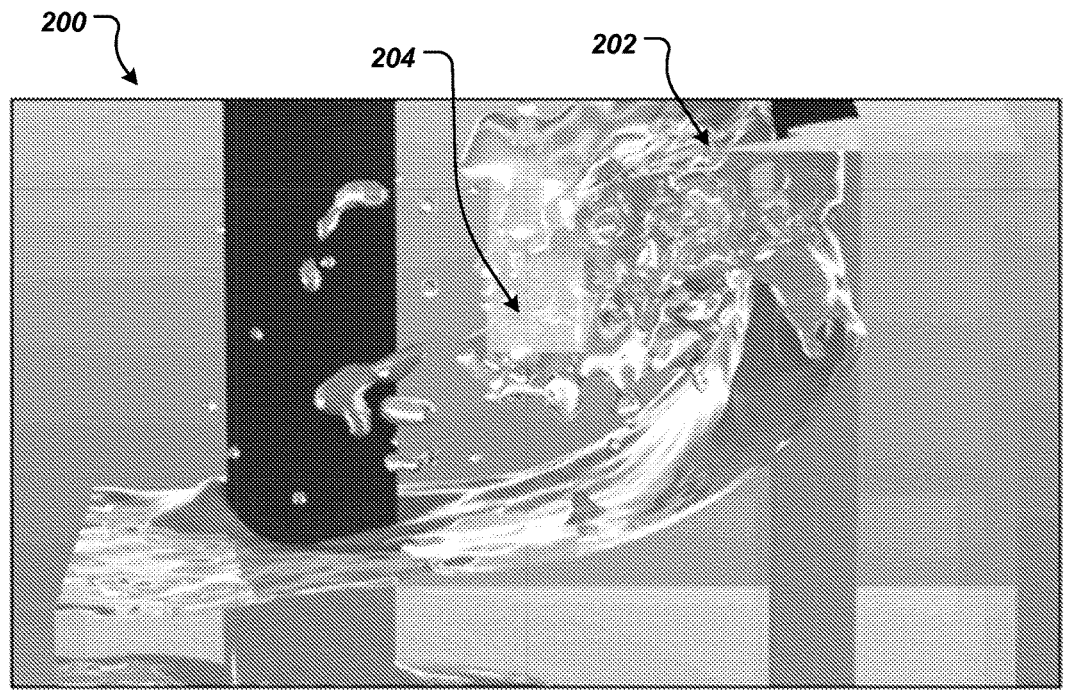
FIG. 2 shows an example of an online game presented on a display device of a client device.

The users 104 may be players of a video game. FIG. 2 shows an example of a video game such as a liquid control game where a user controls the movement of simulated liquid 202 on a display device 200 of a client device by tilting the client device in the direction that the user desires the simulated liquid 202 to flow. Points are awarded according to a volume of the liquid that passes through a target 204. Although the game play, controls, and objectives may be simple, the visual dynamics of the simulated liquid may not be. Free-surface liquids may exhibit rolling waves, droplet sprays, and separating sheets that may be difficult to simulate and render in real time on a client device. The visual dynamics of the simulated liquid for every possible sequence of user inputs is precomputed and stored to provide an interactive simulation of free-surface liquids on a client device. The self-refining liquid control game can use player input data to guide precomputation of output data for the most visited states of the game, thereby continuously improving the game's quality over time and ultimately providing a high-quality, realistically rendered, interactive simulation of free-surface liquids on a client device.

Figure 3:
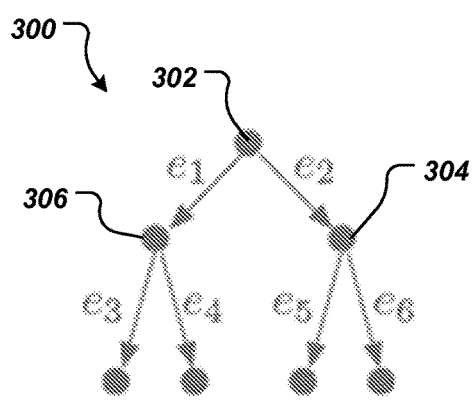
FIG. 3 shows an example of a directed graph that can be used to model a dynamic system.

FIG. 3 shows an example of a directed graph 300 that can be used to model a game, and the game that is presented to a user may be an interactive animation. The graph 300 has vertices, e.g., vertices 302, 304, 306, and edges, e.g., edges $e_1$, $e_2$, $e_3$, $e_4$, $e_5$, $e_6$. Each vertex represents a state of the animation that is responsive to a discrete control input. Each vertex is connected to a number of outgoing edges where the number is equivalent to the number of possible discrete control inputs. Each edge connects two vertices that represent a source state and destination state. Each edge represents a transition between the states of the connected vertices. At runtime, user input determines which edges or transitions to follow. If the transitions are sufficiently short, the game feels interactive. The graph can be iteratively grown by concentrating precomputation of output data for the states and transitions visited by users. As more crowd-sourced data is obtained, the graph may become larger and visual errors may be decreased through addition of states and addition or replacement of transitions.

In the example of FIG. 3, the game modeled by the graph 300 has two possible discrete control inputs, e.g., tilt left and tilt right. Each vertex of the graph 300 is connected to two outgoing edges where one edge is followed when a user tilts a client device to the left, and the other edge is followed when the user tilts the client device to the right. In some implementations, a vertex represents a precomputed output such that the precomputed output is provided to a user upon reaching the vertex. In some implementations, an edge represents a precomputed output such that the precomputed output is provided to a user as the user transitions between vertices connected by the edge.

A precomputed output may be a portion of the animation. A format of the portions of the animation may be application dependent. For example, a portion of the animation can be a static image (e.g., a video frame), a sequence of static images (e.g., a video clip), signed distance functions, a sequence of polygon meshes, or any combination. A portion of the animation can be a blend of other portions of the animation. A portion of the animation can include other suitable data generated using any suitable encoding of the visual dynamics that are to be presented on a display device. In some implementations, a portion of the animation can be generated by simulation. For example, a simulation of free-surface liquids for the liquid control game can be generated using 2D shallow water methods, particle based methods, grids, hybrid methods, or any other suitable method for capturing movement of free-surface liquids.

The server 112 stores information for the game, such as a game graph and precomputed output data, in a data repository 114. The server 112 transmits information for the game to the client devices 102. The client devices 102 are capable of taking inputs that are entered by the users 104 during game play and communicating over network 110 with server 112 and/or with other client devices (not shown). The client devices 102 are capable of continuously playing back short, e.g., one-third of a second, clips without lag between clips. The client devices 102 transmit, e.g., accelerometer data, for selected game controls to the server 112. The client devices 102 may transmit the control input data, e.g., a list of visited graph vertices and the control input selected at each visited vertex, to the server 112 during or after a play session. In some implementations, play of the game by users can benefit subsequent users who play the game by providing crowd-sourced data that can be used to refine and improve game dynamics as more users play the game.

In some implementations, the game is a browser game or an on-demand game, and a client device 102 processes information as it is being received from the server 112 to present the game on a display device of the client device 102. For on-demand gaming, also referred to as cloud gaming, that utilizes cloud-based animation storage and video streaming, the server 112 stores, processes, and renders the precomputed output data, and the video results are streamed directly to a client device 102. The control inputs from a user are transmitted to the server 112, and the server 112 transmits the video results that are responsive to the control inputs. The server 112 may compress or deduplicate similar video sequences using, e.g., linear dimension reduction or frame prediction between clips. The server 112 may use encryption and compression to stream the video results to a client device 102. The client device 102 presents the video results on a display device of the client device 102.

In some implementations, the game is a downloaded game from the server 112. The server 112 may compress the precomputed output data, e.g., 3D data, to facilitate download and storage of the precomputed data. The client device 102 may store a game graph and the precomputed output data received from the server 112. The client device 102 may process and render the stored precomputed outputs associated with the visited vertices and edges of the game graph to present the downloaded game on a display device of the client device 102.

In some implementations, some information for the game may be stored in a client device 102, and other information for the game may be stored in the data repository 114. For example, the server 112 transmits, to a client device 102 in advance of game play, a portion of the game graph that includes vertices and edges in the top (e.g., five) most visited paths of the game graph, and precomputed output data corresponding to that portion of the game graph. The most visited paths can be determined using control inputs collected from previous players. The most visited paths represent a prediction of a likely sequence of control inputs that will be entered by a user during game play. The client device 102 stores that portion of the game graph and the corresponding precomputed outputs. During game play, a user of the client device 102 enters a sequence of control inputs that are included in the portion of the game graph stored on the client device 102. The client device 102 processes and renders the stored precomputed outputs associated with the visited vertices and edges of the game graph. The user of the client device 102 then enters a sequence of control inputs that are not included in the portion of the game graph stored in the client device 102. The client device 102 transmits the control inputs to the server 112. The server 112 retrieves the portion of the game graph that is responsive to the control inputs and the corresponding precomputed outputs from the data repository 114 and transmits the portion of the game graph and the precomputed outputs to the client device 102. The client device 102 processes the portion of the game graph to determine the visited vertices and edges and render the corresponding precomputed outputs to present the remaining portion of the game on a display device of the client device 102.

In some implementations, the client device 106 provides an interaction design tool (described in more detail with reference to FIG. 7 below) that displays information associated with the graph, e.g., its structure, to the user 108, such as an artist or interaction designer, to allow the user 108 to modify the flow of user interaction for an animation represented by the graph. For example, the user 108 can query the graph to determine whether and where certain behaviors occur in the precomputed animation. The user 108 can query the graph to determine which animations lead to which other animations. The user 108 can delete edges from, or otherwise modify, the graph to guide other users 104, such as game players, to desired sections of the graph. The user 108 can select certain animations provided by certain edges or vertices of the graph for further refinement or editing.

Figure 4:
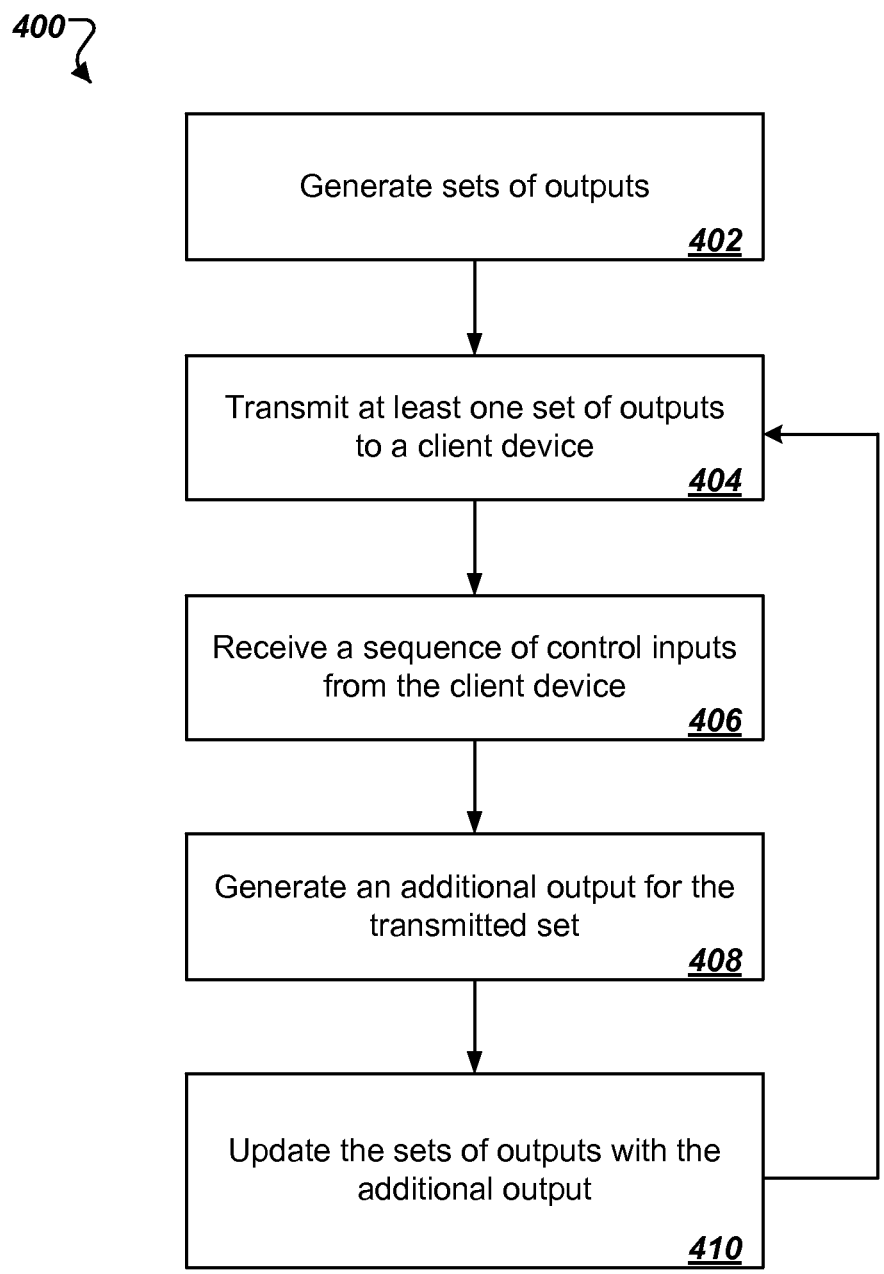
FIG. 4 is a flowchart of an example of a process for precomputing data that are to be presented in real time.

FIG. 4 is a flowchart of an example of a process for precomputing data for a dynamic system having discrete control inputs. The process 400 may be performed by a system of one or more computers, such as server 112 of FIG. 1. The process 400 may include details that have been described above.

The system generates sets of precomputed outputs (402). Each set of outputs may be associated with a different sequence of discrete control inputs. Each set of outputs includes an output that provides a stored portion of an animation. Generating the sets of precomputed outputs can include generating a directed graph as described above.

The system may generate initial sets of precomputed outputs using a heuristic model to bootstrap a small graph, as described in more detail below. To initialize a new graph, the system begins at a start state of the graph, e.g., vertex 302 of FIG. 3, and precomputes outputs by, e.g., simulation, for every possible transition originating from the start state, e.g., edges $e_1$ and $e_2$. The system generates N new precomputed outputs from each state until a small N-ary tree, e.g., graph 300 of FIG. 3, is created.

Leaf edges, e.g., edges $e_3$, $e_4$, $e_5$, $e_6$ of FIG. 3, lead to dead ends in the graph 300 where no outputs have been precomputed for the destination states. In some implementations, a graph includes dead ends. When a control input is received at a dead end, the system ignores the input or places the input into a queue until an output can be precomputed, e.g., until an animation can be simulated, for the control input.

Figure 5:
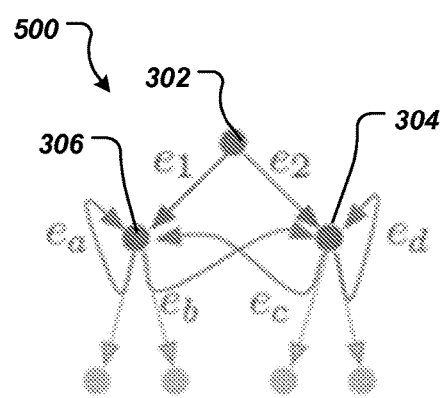
FIG. 5 shows an example of a directed graph that can be used to model a dynamic system.

In some implementations, the system eliminates dead ends to ensure that a precomputed output exists for every possible control at every vertex. As shown in FIG. 5, the system eliminates a dead end by generating a transition from a vertex to the same or a different vertex, e.g., generating an edge $e_c$, from vertex 304 to vertex 306 of the graph 500. The edge $e_c$ may represent a blending of a precomputed output provided by edge $e_5$ with a precomputed output provided by the edge $e_1$. Applying the blending procedure to all the leaf edges results in a tree that is a complete motion graph 500, as shown in FIG. 5. Because the initial tree is a small N-ary tree, many of the blend edges may connect dissimilar edges and may therefore be of low quality.

The quality of the graph 500 can be improved by growing the graph by precomputing new outputs, e.g., new simulation data, based on collecting control inputs from users. Crowdsourced user data can be used to concentrate precomputation of output data in a user explored subset of a dynamical space. Referring again to FIG. 4, to collect control inputs from users, the system accesses and transmits at least one of the sets of outputs to a client device (404) and receives a sequence of control inputs from the client device (406). The system can use user models, described in more detail below, to predict what sequence of discrete control inputs may be received from client devices. Based on the prediction, the system can determine which sets of outputs to transmit to the client device. To grow the graph, the system generates an additional output (408) and updates the sets of outputs with the additional output (410). To generate the additional output, the system traverses the graph based on the received sequence of control inputs to determine where in the graph the additional output can be generated.

Figure 6:
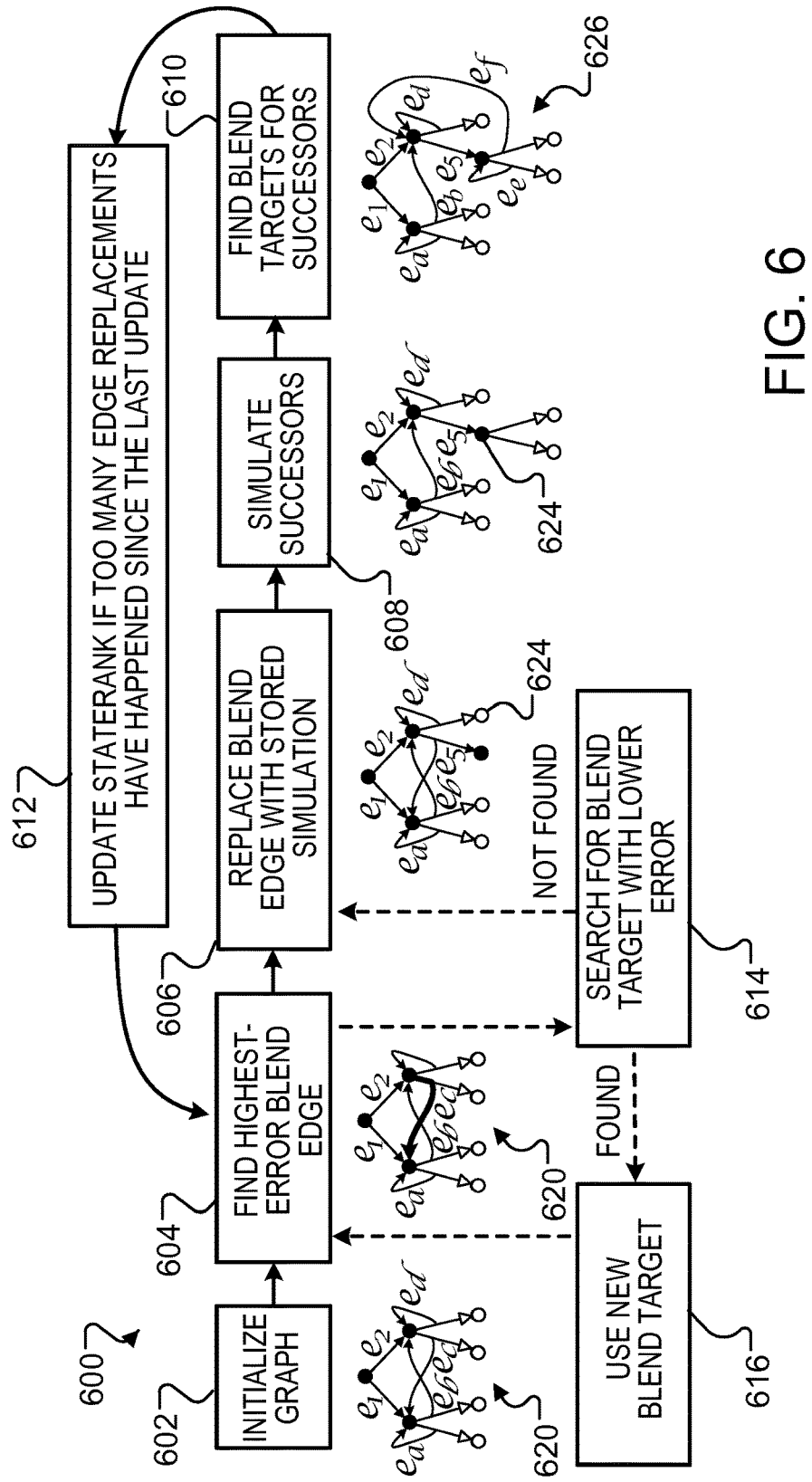
FIG. 6 is a flowchart of an example of a process for generating an initial graph and growing the initial graph with precomputed outputs.

FIG. 6 is a flowchart of an example of a process 600 for generating an initial graph 620 and growing the initial graph 620 with sets of precomputed outputs. The system generates the initial graph 620 with initial sets of precomputed outputs (602) as previously described with reference to FIGS. 3 and 5. To grow a graph, the system identifies the highest-error blend edge, e.g., edge $e_c$ of graph 622 (604). In some implementations, the metric STATERANK can be used to measure expected error of a blend edge according to the following formula:

$$\Sigma_{e \in B} P(e) err(e)$$

where $P(e)$ is the probability of traversing the edge e.

When an initial graph is created, no user data exists. In some implementations, a heuristic model $P_h(c|v)$ is used to bootstrap graph growth. Any suitable heuristic model can be used, which may be application dependent. For example, a controller which maintains the current control c at vertex v with probability a and otherwise chooses an alternate control uniformly at random can be used. A heuristic model for the controller can be defined as follows:

$$P_h(c \mid v) = \begin{cases} \alpha & \text{if } c = c_v \\ (1-\alpha)/N & \text{otherwise} \end{cases}.$$

The edge probabilities P(e) of STATERANK can be computed as the normalized first eigenvector of the transition matrix implied by the heuristic model $P_h(c|v)$. Combining the heuristic model with the metric STATERANK, a growth strategy SR-HEURISTIC is produced. Based on the SR-HEURISTIC values of the blend edges, the system can identify the blend edge having the maximum expected error.

After receiving control inputs from users who play the game modeled by the graph, the system can grow the graph by analyzing the control inputs and concentrating on those states that users actually visit to build a graph with fewer visual artifacts. A user model can be learned from user traversals of the graph, including a list of vertices visited and the control inputs selected by users at each vertex. The observed conditional control probabilities $P_{obs}(c|v)$ can be computed by normalizing control counts at vertex v, and $P_{obs}(v)$ is the observed probability of visiting vertex v obtained by normalizing the number of visits to vertex v by the total number of vertex visits. The user model can be implemented using a kernel density estimator combined with a Markov prior with weight $\epsilon$ according to the following:

$$P(c \mid v) = \sum_{\substack{u \in V \\ c_u = c_v}} w_u P_{obs}(c \mid u) P_{obs}(u)$$

$$w_u = k_{tri}(r, pdist(u, v)) + \epsilon,$$

where $k_{tri}(r, x)$ is a triangular kernel with radius r, $c_u$ and $c_v$ are the control inputs of the precomputed outputs generating vertices u and v, and V is the set of vertices in the graph. The condition $c_u = c_v$ in the summation may create a different user model for each control input.

The user model can be evaluated even when vertex v has not been visited by any user. The user model can be used to guide sampling deep into the graph without having to wait for new user input data at every vertex, and can be used to transfer predicted user behaviors pertaining to one graph to explorations of other similar graphs. The value P(e) of the metric STATERANK can be inferred from the user model P(c|v) given conditional probabilities of control inputs c at each vertex v. The edge probabilities P(e) of STATERANK can be computed as the normalized first eigenvector of the transition matrix implied by the user model P(c|v). Combining the user model with the metric STATERANK, a crowdsourced quality measure SR-CROWD is produced. Based on the SR-CROWD values of the blend edges, the system can identify the blend edge having the maximum expected error.

An example of the computation of the user model will now be described in the context of the liquid control game shown in FIG. 2. The liquid state at graph vertices v can be represented as lists of liquid particle positions and velocities. The k-frame animations along graph edges can be assigned distance functions $e^1, \ldots, e^k$ generated from particle data using any suitable method. For example, a k equal to 10 will yield transitions between vertices of length one-third of a second.

Two different distance metrics can be used. For blending, a function $dist(e_i, e_j, c)$ is used based on energy. The user model may require more frequent distance computations, and a function $pdist(e_i, e_j)$, which compares only coarse shape descriptors, can be used for distance computations for the user model. In some implementations, the function $dist(e_i, e_j, c)$ is defined to be a perceptually-motived error function incorporating information both about the liquid's shape and its energy, and is defined according to:

$$dist(e_i, e_j, c) = \text{norm}_e(e_i, e_j)(\text{dist}_s(e_i, e_j) + w_e \text{dist}_e(e_i, e_j, c)).$$

In the above function, $\text{dist}_s$ and $\text{dist}_e$ denote the parts of distance attributable to the shapes and the energies of the two states, respectively, and the weight $w_e$ controls their relative priority. The weight $W_e$ is set so that for edges $r_i$ and $r_j$ where the fluid is nearly at rest, the distance function is given by:

$$\text{dist}_a = (r_i, r_j) \approx w_e \text{dist}_e(r_i, r_j, c).$$

The metric $\text{dist}_s$ penalizes the blending of animations that contain liquid in very different shapes. The metric $\text{dist}_s$ is the sum of the volumes of the symmetric difference $(X \Delta Y = X \cup Y \setminus X \cap Y)$ between each animation's liquid volumes at each frame and is given by:

$$\text{dist}_a(e_i, e_j) = \sum_{f=1}^{k} vol(e_i^f \Delta e_j^f).$$

The metric $\text{dist}_e$ penalizes the blending of animations that have very different energies. It strongly penalizes blending an animation with low energy into an animation with high energy, thus enforcing conservation of energy. Omitting the metric $\text{dist}_e$ can result in the formation of small loops in the motion graph far away from energy minima, which can look unnatural.

Energy at a vertex v is defined as $E(v, c) = T(v) + V(v, c)$, where T is kinetic energy, V is potential energy and c is the incoming control. Because selecting a gravity vector will change the potential energy, energy depends on the current control input. Let $v_i$ and $v_j$ be the destination vertices of edges $e_i$ and $e_j$. The energy error between edges $e_i$ and $e_j$ is given by:

$$\text{dist}_e(e_i, e_j, c) = \gamma |E(v_i, c) - E(v_j, c)|$$

$$\gamma = \begin{cases} c_{gain} & \text{if } |E(v_i, c) - E(v_j, c)| < T_0 \\ c_{loss} & \text{if } |E(v_i, c) - E(v_j, c)| \geq T_0 \end{cases}$$

where $c_{gain} \gg c_{loss}$, and $T_0$ is approximately the residual kinetic energy of the fluid when it is visually at rest. The threshold may be placed between the minor energy loss penalty and the stiff energy gain penalty at $T_0$ to avoid penalizing blends between visually indistinguishable animations of static fluid.

The previous two terms can be normalized by multiplying them by $\text{norm}_e$. With vertices $v_i$ and $v_j$ being the destination vertices of edges $e_i$ and $e_j$, $c_i$ and $c_j$ being the control inputs for the vertices, and $T_{avg} = \frac{1}{2}(T(v_i) + T(v_j))$, the following then applies:

$$\text{norm}_e(e_i, e_j) = \begin{cases} 0 & \text{if } T_{avg} < T_0 \text{ and } e_i = e_j \\ \dfrac{1}{\sqrt{T_{avg} + T_0}} & \text{otherwise} \end{cases}$$

The metric STATERANK performs neighbor searches using a brute-force scan of all vertices in the graph, so a fast function may be used to compute vertex distances. In some implementations, to accelerate nearest-neighbor search, a full distance evaluation is performed on the k-closest edges according to the energy distance metric. An appropriate value for k may be, for example, k=100. If k is too low, the result may be a failure to identify good blend targets even if the graph includes high quality blend targets.

In some implementations, a more efficient coarse shape similarity function pdist is used in the user model. A shape descriptor $d_i$ is computed for each edge $e_i$ by dividing the fluid domain into a 6×6×6 grid and computing the average fraction of each cell that is occupied by liquid. The function pdist can be defined as:

$$p\text{dist}(e_i, e_j) = \|d_i - d_j\|_2.$$

In FIG. 6, the system removes the highest-error blend edge $e_c$, as identified using the metric STATERANK calculated with either the heuristic model or the user model, and replaces the edge $e_c$ with edge $e_5$ that provides a precomputed output such as a newly generated or stored simulation (606). The system precomputes outputs by, e.g., simulation, for the outgoing edges of the destination state, e.g., vertex 624, (i.e., successors) of the new edge $e_5$ (608). The new outputs form new dead ends that are blended to create edges $e_e$ and $e_f$.

The system blends the precomputed outputs for the outgoing edges of the vertex 624 with precomputed outputs associated with internal edges (610) resulting in a graph 626. In some implementations, animations are constructed for blend edges by blending signed distance functions. A simple linear interpolation may be used when the fluid surfaces do not contain any fine features. However, in the presence of droplets, splashes, and thin sheets, linear interpolation can cause popping artifacts at the beginning and end of the blend. In one example, convex combinations of three signed distance functions are blended: the source $\phi_s$, the destination $\phi_d$, and the union of their shapes, $\min(\phi_s, \phi_d)$. An example of a blend function that can be used is as follows:

$$\text{blend}(\phi_s, \phi_d, t) = w_s \phi_s + w_d \phi_d + w_{s \cup d} \min(\phi_s, \phi_d)$$

$$w_s = \text{clip}(1 + l - 2t)$$

$$w_d = \text{clip}(2t + l - 1)$$

$$w_{s \cup d} = 1 - w_s - w_d$$

where $0 \leq t \leq 1$ denotes the position in the blend, the clip function clips its argument to lie between 0 and 1, and the parameter l limits the blending coefficient applied to the union. In some implementations, l=0.1 is used to avoid perceptible increases in liquid volume during blends.

The system updates STATERANK metrics if too many edge replacements have happened since the last update of the graph (612). Growing the graph can be a continuous process by repeating 604-612 of the process 600 to successively replace blend edges with real simulation edges and new states.

Each time a new edge is added to a graph, edge nearest neighbor relationships in the graph may change. Recomputing optimal graph blends after each new edge is added can be costly. In some implementations, instead of "relinking" existing blend edges when new edges are created, the system first attempts to relink the highest-error blend edge with existing edges in the graph (604) prior to exploring other blend edges. If a superior blend target can be found in the graph (614), the new blend is immediately created using the superior blend target and used to replace the existing blend (616). If a superior blend target is not found in the graph (614), the system replaces the blend edge with a new or stored simulation (606). This is referred to as "lazy relinking" which may ensure that simulation is only performed on edges for which there are no good blend target candidates in the graph, without incurring the overhead of unnecessarily reevaluating edge nearest neighbors after new edges are simulated. The above processes can be applied to any precomputed game with discrete control inputs.

In some implementations, a distributed system is constructed to carry out large-scale graph explorations. The system can include a master node and a pool of worker nodes. The master node orchestrates computation by maintaining the graph structure, computing edge priorities and distances, and assigning work to the worker nodes. The worker nodes perform simulation and render animations.

The system initializes graph exploration with a minimal graph containing one vertex and N+1 edges. The system then proceeds with graph expansion. During exploration, the master node maintains a work queue enumerating blend edges to explore. When a worker node becomes available, the master node extracts the highest priority blend from the queue and assigns the corresponding simulation tasks to the worker node. When the worker node returns simulation results to the master node, the master node computes blends for the newly simulated edges, and updates the graph. In STATERANK-based explorations, the master node periodically discards blend-edge priorities, recomputes STATERANK on the current graph, and uses the results to re-initialize blend edge priorities.

In some implementations, precomputed outputs, live elements, and other virtual elements can be decomposed, composited together, and/or coupled. Precomputed systems can be generalized (e.g., using multi-way blends), which may turn the discrete graph representation into a continuous space of precomputed dynamics.

In some implementations, to limit of increasing control resolution, nearly every clip is a blend. This is done by sparsely sampling control where control branches should only be inserted when user data indicates they are necessary. At run-time, the system would trade off simulation and control error. This approach can be scaled to (multi-dimensional) continuous controls. Similarly, clip length may have implications for blending. As the clip length approaches one frame, blends become jump discontinuities. This could be addressed by globally optimizing the graph to ensure smooth transitions.

Figure 7:
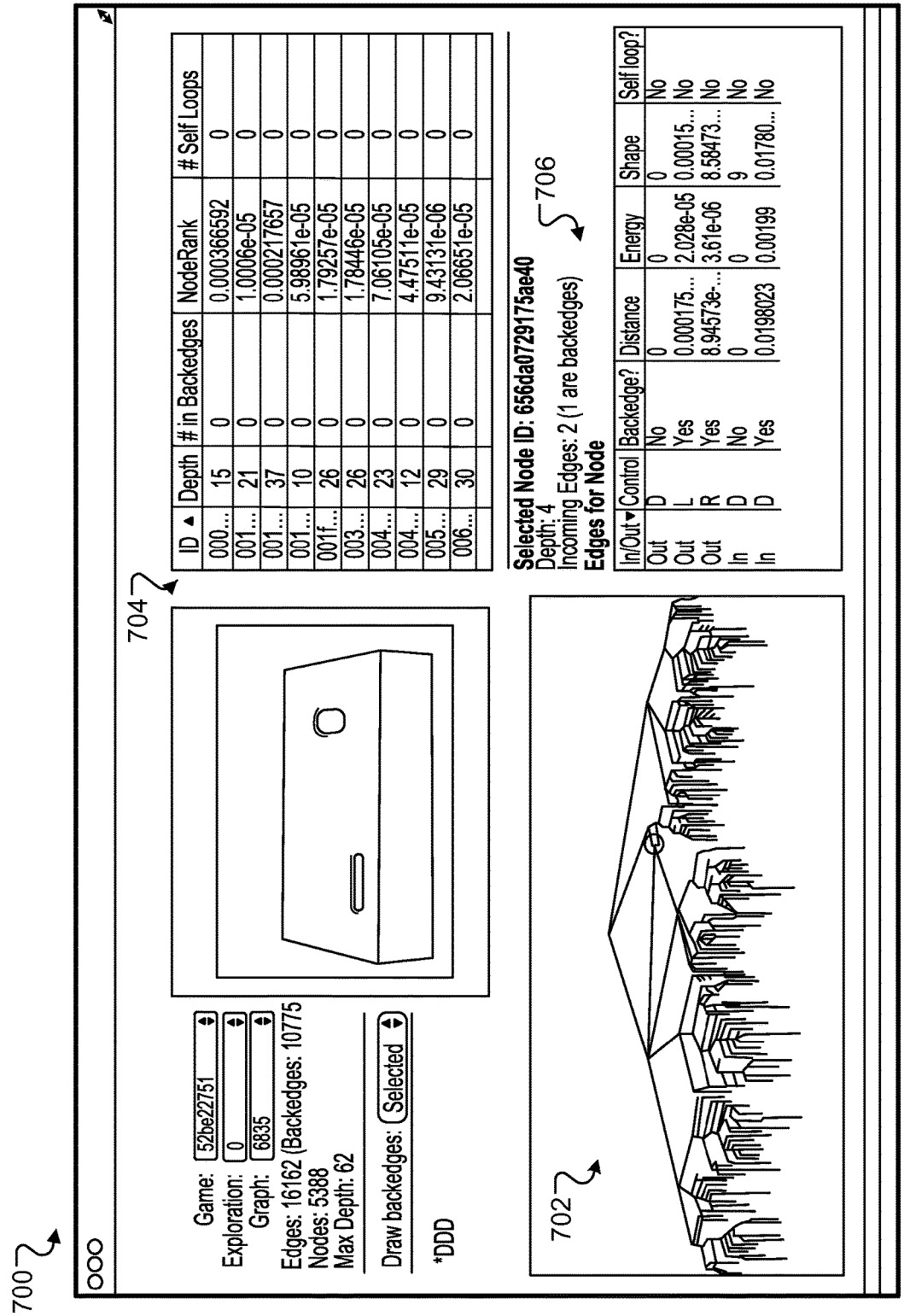
FIG. 7 is an example of a user interface of an interaction design tool that displays a graph representing an animation

FIG. 7 is an example of a user interface 700 of an interaction design tool that displays a graph 702 representing an animation. The interaction design tool allows a user to understand the contents of the interactions contained in the graph 702 to easily manipulate the graph contents, and to control the behavior of the underlying graph precomputation process.

The interaction design tool may allow the user to query the graph information for vertices and edges matching certain constraints. These constraints could be graph properties (e.g., in-degree of a vertex, distance from the root, size of the smallest cycle of which the vertex/edge is a member), properties of the data associated with a particular vertex or edge (e.g., potential energy of a simulation, error of a blend edge, user visit counts), or information derived from both sources (e.g., STATERANK values).

The interaction design tool can display information for the graph 702, as shown in FIG. 7. In some implementations, the displayed information is filtered or modulated by query results. The information for the graph may include the graph 702 displayed along with data 704 for the vertices and data 706 for the edges of the graph 702. The display of the graph information may be in tabular or visual form. The display of the graph information may include other graph properties, such as statistics of the whole graph or of the query results. The statistics can include, for example, number of edges, number of blend edges, distribution of cycle sizes, average error, STATERANK values, and so forth. A query property can be displayed, for example, in tabular form or by color-coding graph edges/vertices. Other graph properties that can be displayed also include projected edge error values, STATERANK values, control probabilities, or visit statistics resulting from alternate player models or error models.

The interaction design tool may allow the user to manipulate the stored animations associated with the graph 702. For example, the user can export animations associated with an edge or vertex for manual editing. The user can alter blend parameters or select a different blend function for a particular edge or set of edges. The user can manually choose targets for particular edges. The user can delete parts of the graph 702. If deletion of a part of the graph 702 results in any dead ends, the dead ends may be resolved by reverting them to their last known blend target before the deletion, or by simply choosing to leave them as dead ends. The user can insert new graph edges and vertices along with hand-generated animation for them.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

To provide for interaction with a user, embodiments can be implemented on a computer having a display device, e.g., a LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method or parts thereof may use the "World Wide Web" (Web or WWW), which is that collection of servers on the Internet that utilize the Hypertext Transfer Protocol (HTTP). HTTP is a known application protocol that provides users access to resources, which may be data in different formats such as text, graphics, images, sound, video, Hypertext Markup Language (HTML), as well as programs. Upon specification of a link by the user, the client computer makes a TCP/IP request to a Web server and receives data, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Windows 7, Windows 8, Sun, Linux, and Macintosh may also be used. Computer users can view data available on servers or networks on the Web through the use of browsing software, such as Firefox, Netscape Navigator, Microsoft Internet Explorer, or Mosaic browsers. The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the invention.

What is claimed is:

1. A method comprising:
    accessing a plurality of sets of outputs for an interactive animation, with each set of outputs being associated with a different sequence of a plurality of sequences of discrete control inputs, and with each set of outputs comprising an output that provides a stored portion of the interactive animation;
    identifying a particular output of the plurality of sets of outputs that provides a blend of first and second stored portions of the interactive animation, the blend being associated with an error value above a threshold, wherein the error value represents a difference between the first stored portion of the interactive amination included in the blend and the second stored portion of the interactive animation included in the blend;
    in accordance with the error value being above the threshold, modifying the particular output to provide a third stored portion of the interactive animation;
    replacing, in the particular output, the blend of the first and second stored portions of the interactive animation with the third stored portion; and
    transmitting, to a client device, information indicative of at least one of the plurality of sets of outputs that includes the particular output that provides the third stored portion of the interactive animation, which when rendered by the client device causes the interactive animation to be presented to a user.

2. The method of claim 1, further comprising generating the plurality of sets of outputs for the interactive animation prior to transmitting the information to the client device.

3. The method of claim 2, wherein generating the plurality of sets of outputs for the interactive animation comprises:
    generating a directed graph comprising a plurality of vertices and a plurality of edges, with each of the plurality of vertices representing a state of the interactive animation that is responsive to a discrete control input, with each of the plurality of vertices connected to a number of outgoing edges where the number is equivalent to a number of possible discrete control inputs, and with each edge connecting two of the plurality of vertices and representing an output of the plurality of sets of outputs.

4. The method of claim 2, wherein generating the plurality of sets of outputs for the interactive animation comprises:
    generating the plurality of sets of outputs for the interactive animation based on a heuristic user model.

5. The method of claim 2, wherein generating the plurality of sets of outputs for the interactive animation comprises:
    generating the plurality of sets of outputs for the interactive animation based on receiving, from a plurality of client devices, sequences of discrete control inputs that are associated with sets of outputs of the plurality of sets of outputs for the interactive animation.

6. The method of claim 2, wherein generating the plurality of sets of outputs for the interactive animation comprises:
    generating the plurality of sets of outputs for the interactive animation using a kernel density estimator combined with a Markov prior.

7. The method of claim 1, wherein a stored portion of the interactive animation comprises at least one of a static image, a sequence of static images, one or more signed distance functions, or a sequence of polygon meshes.

8. The method of claim 1, wherein the output that provides the stored portion of the interactive animation is a first output that provides a first stored portion of the interactive animation, and the method further comprises:
receiving a sequence of discrete control inputs for the at least one of the plurality of sets transmitted;
generating, by one or more processing devices, a second output for the at least one of the sets of outputs in accordance with the received sequence of discrete control inputs so that the second output provides a second stored portion of the interactive animation, the second output to be provided after the first output of the set of outputs during presentation of the interactive animation; and
updating the plurality of sets of outputs for the interactive animation with the second output for the set of outputs associated with the received sequence of discrete control inputs.

9. The method of claim 8, wherein each set of outputs of the accessed plurality of sets of outputs comprises a third output that provides a blend of stored portions of the interactive animation, the third output to be provided after the first output of the set of outputs during presentation of the interactive animation.

10. The method of claim 9, wherein updating the plurality of sets of outputs for the interactive animation with the second output comprises:
replacing the third output of the set of outputs associated with the received sequence of discrete control inputs with the second output.

11. The method of claim 10, further comprising:
generating a fourth output that provides a blend of stored portions of the interactive animation, the fourth output to be provided after the second output during presentation of the interactive animation.

12. The method of claim 1, further comprising:
while the interactive animation is being presented to the user, generating data in real-time for presentation to the user along with the interactive animation.

13. The method of claim 1, wherein transmitting, to the client device, the information indicative of the at least one of the plurality of sets of outputs for the interactive animation comprises:
generating a renderable representation of the interactive animation provided by the at least one of the plurality of sets of outputs; and
transmitting the renderable representation of the interactive animation for rendering by the client device in real-time.

14. The method of claim 1, wherein transmitting, to the client device, the information indicative of the at least one of the plurality of sets of outputs for the interactive animation comprises:
transmitting visualization data for the interactive animation, which when processed by the client device causes the client device to generate a renderable representation of the interactive animation and to render the renderable representation for presentation of the interactive animation to the user.

15. The method of claim 1, wherein transmitting the information indicative of the at least one of the plurality of sets of outputs for the interactive animation comprises:
transmitting information for an online game that comprises the at least one of the plurality of sets of outputs for the interactive animation.

16. The method of claim 1, wherein transmitting the information indicative of the at least one of the plurality of sets of outputs for the interactive animation comprises:
transmitting the information indicative of the at least one of the plurality of sets of outputs for the interactive animation based on a prediction of a sequence of discrete control inputs to be received during presentation of the interactive animation to a user.

17. The method of claim 1, wherein each stored portion of the interactive animation is assigned an energy metric, and wherein the error value represents a difference between a first value of the energy metric for the first stored portion of the interactive animation and a second value of the energy metric for the second stored portion of the interactive animation.

18. The method of claim 17, wherein the energy metric is defined in accordance with a kinetic energy value, a potential energy value, and a discrete control input.

19. The method of claim 1, wherein each stored portion of the interactive animation is assigned a shape metric, and wherein the error value represents a difference between a first value of the shape metric for the first stored portion of the interactive animation and a second value of the shape metric for the second stored portion of the interactive animation.

20. The method of claim 19, wherein the shape metric for a given stored portion of the interactive animation is defined in accordance with an occupancy fraction value of the given stored portion of the interactive animation.

21. The method of claim 1, wherein the third stored portion of the interactive animation is simulated by a simulation engine in response to identification of the blend and in response to identifying the particular output.

22. A system comprising:
one or more processing devices; and
one or more computer-readable media storing instructions that are executable by the one or more processing devices to perform operations comprising:
accessing a plurality of sets of outputs for an interactive animation, with each set of outputs being associated with a different sequence of a plurality of sequences of discrete control inputs, and with each set of outputs comprising an output that provides a stored portion of the interactive animation;
identifying a particular output of the plurality of sets of outputs that provides a blend of first and second stored portions of the interactive animation, the blend being associated with an error value above a threshold, wherein the error value represents a difference between the first stored portion of the interactive amination included in the blend and the second stored portion of the interactive animation included in the blend;
in accordance with the error value being above the threshold, modifying the particular output to provide a third stored portion of the interactive animation;
replacing, in the particular output, the blend of the first and second stored portions of the interactive animation with the third stored portion; and
transmitting, to a client device, information indicative of at least one of the plurality of sets of outputs that includes the particular output that provides the third stored portion of the interactive animation, which when rendered by the client device causes the interactive animation to be presented to a user.

23. The system of claim 22, the operations further comprising generating the plurality of sets of outputs for the interactive animation prior to transmitting the information to the client device.

24. The system of claim 23, wherein generating the plurality of sets of outputs for the interactive animation comprises:
generating a directed graph comprising a plurality of vertices and a plurality of edges, with each of the plurality of vertices representing a state of the interactive animation that is responsive to a discrete control input, with each of the plurality of vertices connected to a number of outgoing edges where the number is equivalent to a number of possible discrete control inputs, and with each edge connecting two of the plurality of vertices and representing an output of the plurality of sets of outputs.

25. The system of claim 23, wherein generating the plurality of sets of outputs for the interactive animation comprises:
generating the plurality of sets of outputs for the interactive animation based on a heuristic user model.

26. The system of claim 23, wherein generating the plurality of sets of outputs for the interactive animation comprises:
generating the plurality of sets of outputs for the interactive animation based on receiving, from a plurality of client devices, sequences of discrete control inputs that are associated with sets of outputs of the plurality of sets of outputs for the interactive animation.

27. The system of claim 23, wherein generating the plurality of sets of outputs for the interactive animation comprises:
generating the plurality of sets of outputs for the interactive animation using a kernel density estimator combined with a Markov prior.

28. The system of claim 22, wherein a stored portion of the interactive animation comprises at least one of a static image, a sequence of static images, one or more signed distance functions, or a sequence of polygon meshes.

29. The system of claim 22, wherein the output that provides the stored portion of the interactive animation is a first output that provides a first stored portion of the interactive animation, and the operations further comprise:
receiving a sequence of discrete control inputs for the at least one of the plurality of sets transmitted;
generating, by one or more processing devices, a second output for the at least one of the sets of outputs in accordance with the received sequence of discrete control inputs so that the second output provides a second stored portion of the interactive animation, the second output to be provided after the first output of the set of outputs during presentation of the interactive animation; and
updating the plurality of sets of outputs for the interactive animation with the second output for the set of outputs associated with the received sequence of discrete control inputs.

30. The system of claim 29, wherein each set of outputs of the accessed plurality of sets of outputs comprises a third output that provides a blend of stored portions of the interactive animation, the third output to be provided after the first output of the set of outputs during presentation of the interactive animation.

31. The system of claim 30, wherein updating the plurality of sets of outputs for the interactive animation with the second output comprises:
replacing the third output of the set of outputs associated with the received sequence of discrete control inputs with the second output.

32. The system of claim 31, the operations further comprising:
generating a fourth output that provides a blend of stored portions of the interactive animation, the fourth output to be provided after the second output during presentation of the interactive animation.

33. The system of claim 22, the operations further comprising:
while the interactive animation is being presented to the user, generating data in real-time for presentation to the user along with the interactive animation.

34. The system of claim 22, wherein transmitting, to the client device, the information indicative of the at least one of the plurality of sets of outputs for the interactive animation comprises:
generating a renderable representation of the interactive animation provided by the at least one of the plurality of sets of outputs; and
transmitting the renderable representation of the interactive animation for rendering by the client device in real-time.

35. The system of claim 22, wherein transmitting, to the client device, the information indicative of the at least one of the plurality of sets of outputs for the interactive animation comprises:
transmitting visualization data for the interactive animation, which when processed by the client device causes the client device to generate a renderable representation of the interactive animation and to render the renderable representation for presentation of the interactive animation to the user.

36. The system of claim 22, wherein transmitting the information indicative of the at least one of the plurality of sets of outputs for the interactive animation comprises:
transmitting information for an online game that comprises the at least one of the plurality of sets of outputs for the interactive animation.

37. The system of claim 22, wherein transmitting the information indicative of the at least one of the plurality of sets of outputs for the interactive animation comprises:
transmitting the information indicative of the at least one of the plurality of sets of outputs for the interactive animation based on a prediction of a sequence of discrete control inputs to be received during presentation of the interactive animation to a user.

38. One or more non-transitory computer-readable media storing instructions that are executable by one or more processing devices to perform operations comprising:
accessing a plurality of sets of outputs for an interactive animation, with each set of outputs being associated with a different sequence of a plurality of sequences of discrete control inputs, and with each set of outputs comprising an output that provides a stored portion of the interactive animation;
identifying a particular output of the plurality of sets of outputs that provides a blend of first and second stored portions of the interactive animation, the blend being associated with an error value above a threshold, wherein the error value represents a difference between the first stored portion of the interactive amination included in the blend and the second stored portion of the interactive animation included in the blend;

in accordance with the error value being above the threshold, modifying the particular output to provide a third stored portion of the interactive animation;

replacing, in the particular output, the blend of the first and second stored portions of the interactive animation with the third stored portion; and transmitting, to a client device, information indicative of at least one of the plurality of sets of outputs that includes the particular output that provides the third stored portion of the interactive animation, which when rendered by the client device causes the interactive animation to be presented to a user.

39. The one or more non-transitory computer-readable media of claim 38, the operations further comprising generating the plurality of sets of outputs for the interactive animation prior to transmitting the information to the client device.

40. The one or more non-transitory computer-readable media of claim 39, wherein generating the plurality of sets of outputs for the interactive animation comprises:

generating a directed graph comprising a plurality of vertices and a plurality of edges, with each of the plurality of vertices representing a state of the interactive animation that is responsive to a discrete control input, with each of the plurality of vertices connected to a number of outgoing edges where the number is equivalent to a number of possible discrete control inputs, and with each edge connecting two of the plurality of vertices and representing an output of the plurality of sets of outputs.

41. The one or more non-transitory computer-readable media of claim 39, wherein generating the plurality of sets of outputs for the interactive animation comprises:

generating the plurality of sets of outputs for the interactive animation based on a heuristic user model.

42. The one or more non-transitory computer-readable media of claim 39, wherein generating the plurality of sets of outputs for the interactive animation comprises:

generating the plurality of sets of outputs for the interactive animation based on receiving, from a plurality of client devices, sequences of discrete control inputs that are associated with sets of outputs of the plurality of sets of outputs for the interactive animation.

43. The one or more non-transitory computer-readable media of claim 39, wherein generating the plurality of sets of outputs for the interactive animation comprises:

generating the plurality of sets of outputs for the interactive animation using a kernel density estimator combined with a Markov prior.

44. The one or more non-transitory computer-readable media of claim 38, wherein a stored portion of the interactive animation comprises at least one of a static image, a sequence of static images, one or more signed distance functions, or a sequence of polygon meshes.

45. The one or more non-transitory computer-readable media of claim 38, wherein the output that provides the stored portion of the interactive animation is a first output that provides a first stored portion of the interactive animation, and the operations further comprise:

receiving a sequence of discrete control inputs for the at least one of the plurality of sets transmitted;

generating, by one or more processing devices, a second output for the at least one of the sets of outputs in accordance with the received sequence of discrete control inputs so that the second output provides a second stored portion of the interactive animation, the second output to be provided after the first output of the set of outputs during presentation of the interactive animation; and updating the plurality of sets of outputs for the interactive animation with the second output for the set of outputs associated with the received sequence of discrete control inputs.

46. The one or more non-transitory computer-readable media of claim 45, wherein each set of outputs of the accessed plurality of sets of outputs comprises a third output that provides a blend of stored portions of the interactive animation, the third output to be provided after the first output of the set of outputs during presentation of the interactive animation.

47. The one or more non-transitory computer-readable media of claim 46, wherein updating the plurality of sets of outputs for the interactive animation with the second output comprises:

replacing the third output of the set of outputs associated with the received sequence of discrete control inputs with the second output.

48. The one or more non-transitory computer-readable media of claim 47, the operations further comprising:

generating a fourth output that provides a blend of stored portions of the interactive animation, the fourth output to be provided after the second output during presentation of the interactive animation.

49. The one or more non-transitory computer-readable media of claim 38, the operations further comprising:

while the interactive animation is being presented to the user, generating data in real-time for presentation to the user along with the interactive animation.

50. The one or more non-transitory computer-readable media of claim 38, wherein transmitting, to the client device, the information indicative of the at least one of the plurality of sets of outputs for the interactive animation comprises:

generating a renderable representation of the interactive animation provided by the at least one of the plurality of sets of outputs; and transmitting the renderable representation of the interactive animation for rendering by the client device in real-time.

51. The one or more non-transitory computer-readable media of claim 38, wherein transmitting, to the client device, the information indicative of the at least one of the plurality of sets of outputs for the interactive animation comprises:

transmitting visualization data for the interactive animation, which when processed by the client device causes the client device to generate a renderable representation of the interactive animation and to render the renderable representation for presentation of the interactive animation to the user.

52. The one or more non-transitory computer-readable media of claim 38, wherein transmitting the information indicative of the at least one of the plurality of sets of outputs for the interactive animation comprises:

transmitting information for an online game that comprises the at least one of the plurality of sets of outputs for the interactive animation.

53. The one or more non-transitory computer-readable media of claim 38, wherein transmitting the information indicative of the at least one of the plurality of sets of outputs for the interactive animation comprises:

transmitting the information indicative of the at least one of the plurality of sets of outputs for the interactive animation based on a prediction of a sequence of discrete control inputs to be received during presentation of the interactive animation to a user.

\* \* \* \* \*